United States Patent [19]

Bonino et al.

[11] Patent Number: 4,577,893
[45] Date of Patent: Mar. 25, 1986

[54] CONNECTING CLAMP FOR PNEUMATIC APPARATUS

[75] Inventors: Pierre Bonino, Annecy; Christian Ducret, Annecy le Vieux; Cyrille Mazzoleni, Rumilly, all of France

[73] Assignee: Compagnie Parisienne d'Outillage a Air Comprime, Bonneville, France

[21] Appl. No.: 607,325

[22] Filed: May 4, 1984

[30] Foreign Application Priority Data

May 4, 1983 [FR] France ............... 83 07406

[51] Int. Cl.⁴ ................................ F16L 3/04
[52] U.S. Cl. ................... 285/158; 285/128; 285/349; 174/65 R; 220/3.3; 220/3.8; 220/3.94
[58] Field of Search ........... 285/158, 128, 129, 349, 285/423; 220/3.3, 3.8, 3.94; 174/65 R; 73/201, 273

[56] References Cited

U.S. PATENT DOCUMENTS

| | | | |
|---|---|---|---|
| 1,929,218 | 10/1933 | Sambleson | 220/3.94 |
| 2,480,522 | 8/1949 | Tornblom | 285/128 |
| 2,625,288 | 1/1953 | Clark et al. | 220/3.94 |
| 2,688,417 | 9/1954 | Bowers | 285/128 X |
| 3,083,857 | 4/1963 | Clark | 220/3.94 |
| 3,410,582 | 11/1968 | Appleton | 174/65 R |
| 3,728,470 | 4/1973 | Maier | 285/128 X |
| 4,295,575 | 10/1981 | Flachbarth | 220/3.94 X |

FOREIGN PATENT DOCUMENTS 215675 2/1958 Australia ............... 285/158

Primary Examiner—Cornelius J. Husar
Assistant Examiner—Shirish Desai
Attorney, Agent, or Firm—Sughrue, Mion, Zinn, Macpeak, and Seas

[57] ABSTRACT

A connecting clamp for a pneumatic apparatus (e.g. apparatus for operation with compressed air) which apparatus comprises a substantially parallelepiped shaped body (10) of plastic material associated with a bottom (30) and a lid (40) placed on two opposite faces of the body. The clamp is constituted by a rectangular aluminum alloy plate (50) of substantially the same size as one of the other faces of the body, against which it is applied. The clamp includes a central tapped sleeve (58) for making connection to other pneumatic equipment and lugs (57) projecting perpendicularly from the plate, each lug having an orifice (56) with its axis extending in a plane parallel to the plane of the plate and capable of receiving a rod or screw for fixing the clamp to the body, the rod or screw also passing through the lid or the bottom to fix the lid or the bottom to the body.

5 Claims, 3 Drawing Figures

CONNECTING CLAMP FOR PNEUMATIC APPARATUS

The present invention relates to a clamp for connecting pneumatic apparatus to a compressed gas conduit or to another pneumatic apparatus.

The invention is more particularly related to clamps for pneumatic apparatuses having bodies made of plastic material, such as polyamide which is advantageously impregnated with glass fibers.

BACKGROUND OF THE INVENTION

Until quite recently, pneumatic apparatuses such as pressure regulators, air filters, or lubrifiers were made of metal.

Replacing the metal with plastic material leads to a problem being posed in the provision of connecting clamps.

It is insufficient just to thread the plastic material wall of the apparatus body, since the plastic material is not hard enough, and the thread would be damaged after disassembling a few times. One suggestion has been to put metal inserts in the orifices of the connection, but this solution is expensive.

Preferred embodiments of the present invention provide a connecting clamp which is robust and cheap.

SUMMARY OF THE INVENTION

The present invention provides a connecting clamp for a pneumatic apparatus which comprises a substantially parallelepiped shaped body of plastic material associated with a bottom and with a lid which are placed on respective opposite faces of the body, wherein the clamp is constituted by a rectangular aluminum alloy plate of substantially the same size as one of the other faces of the body, against which it is applied, the clamp including a central tapped sleeve for making a pneumatic connection to other pneumatic equipment and lugs projecting perpendicularly from the plate, each lug having an orifice with its axis extending in a plane parallel to the plane of the plate and capable of receiving a rod or screw for fixing the clamp to the body, the rod or screw also passing through the lid or the bottom to fix the lid or the bottom to the body.

BRIEF DESCRIPTION OF THE DRAWINGS

An embodiment of the invention is described by way of example with reference to the accompanying drawings, in which.

MORE DETAILED DESCRIPTION

Figure 1:
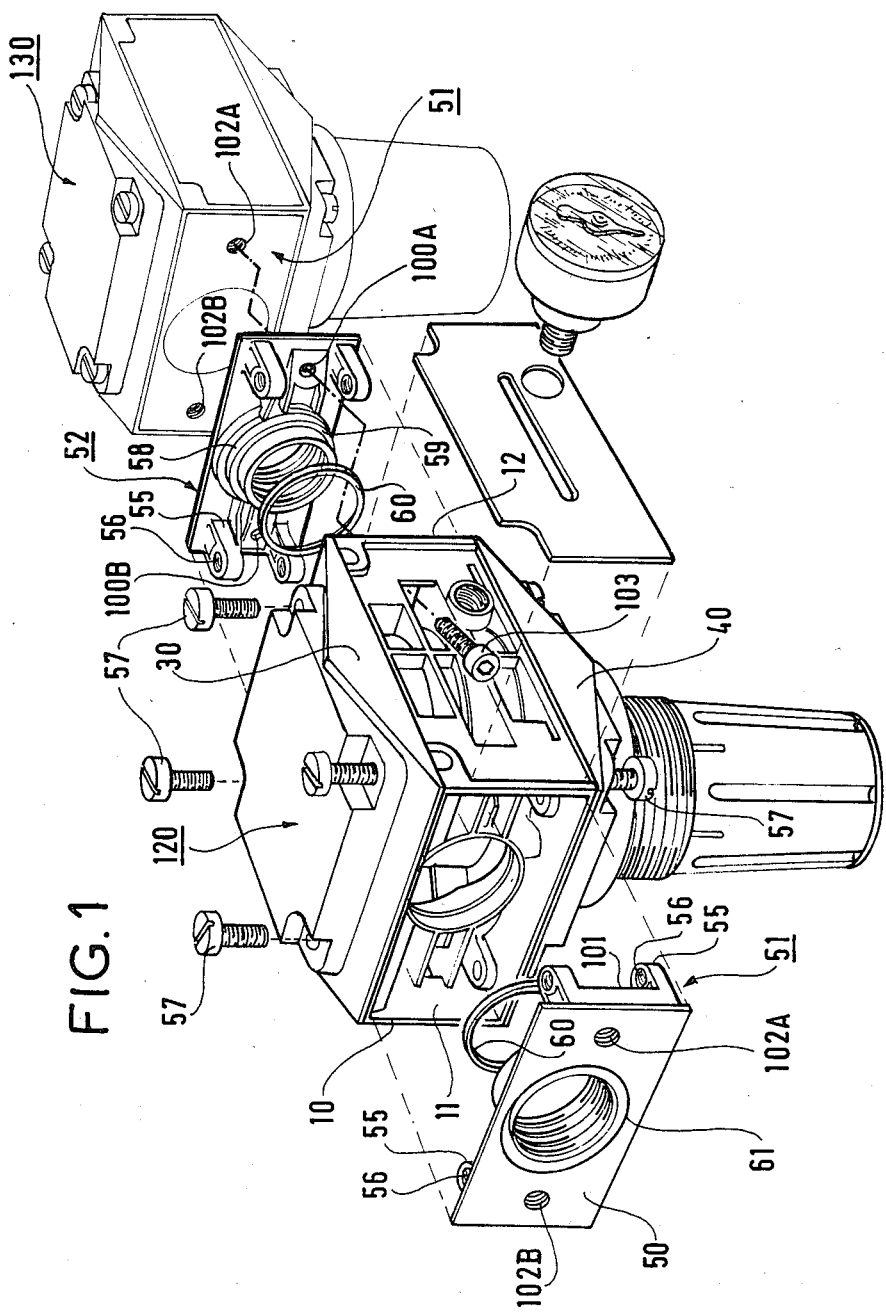
FIG. 1 is a perspective view of a pneumatic pressure regulator fitted with clamps in accordance with the invention.

The example chosen for describing the invention is a pneumatic pressure regulator 120 which constitutes the subject matter of a French patent application filed on the same day as the present application.

This apparatus comprises a substantially parallelipiped shaped body 10 made of molded plastic material and containing units in its interior for performing the desired regulation function. The plastic material is preferably polyamide impregnated with glass fibers.

The body includes two faces 11 and 12 which are preferably opposite faces and which are intended to be connected either to a compressed air conduit or else to another air-processing apparatus, such as 130.

The apparatus includes a lid 30 and a bottom 40, likewise made of plastic material and which are applied against two opposite faces of the body.

Each of the faces 11 and 12 is closed by a respective clamp 51 or 52.

The clamp is constituted by an aluminum alloy plate 50 of substantially the same area as the faces 11 and 12 of the body. The clamp is received in the body to constitute one of its outside faces. It is fixed by lugs such as 55, and there are preferably four such lugs located close to the corners of the plate. Each lug has a tapped hole 56 passing therethrough for receiving a screw such as 57 which also serves to fix the lid 30 or the bottom 40.

The middle of the plate 50 is provided with a sleeve 58 which is integrally cast therewith, which projects from one face of the plate and which is internally tapped. The sleeve is intended to receive the end piece of a compressed air conduit 141 (not shown in FIG. 1, but visible in FIG. 2).

Figure 2:
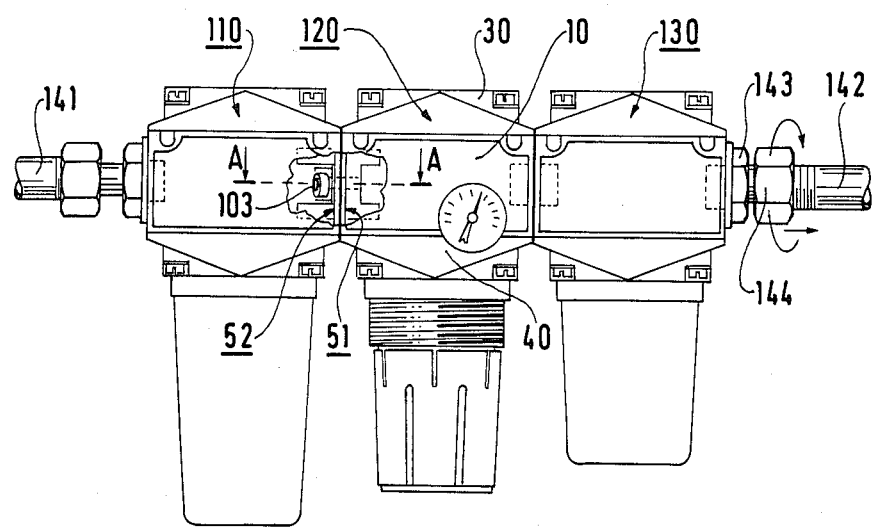
FIG. 2 is an elevation of three interconnected pneumatic apparatuses.
Figure 3:
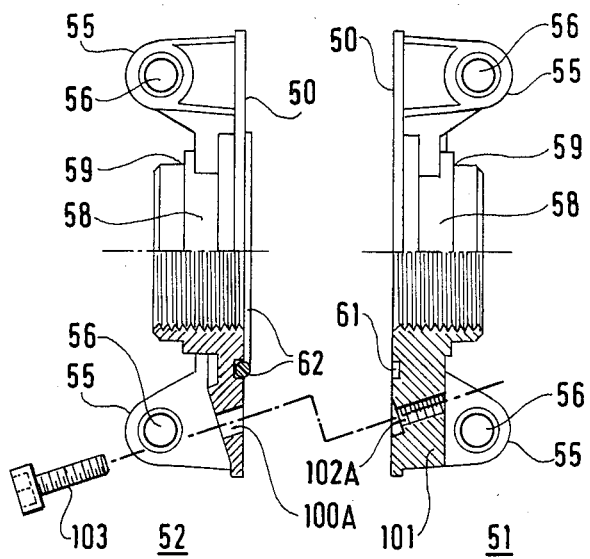
FIG. 3 is a partial section on line A—A of FIG. 2.

The base of the sleeve may be fitted with a shoulder 59 for receiving a sealing ring 60. Likewise, the plate has a groove 61 on its face opposite to the sleeve for receiving a sealing ring 62 which is used when two apparatuses are interconnected clamp to clamp (FIGS. 2 and 3).

It may be observed that a clamp in accordance with the invention can be used in the known technique of sealed juxtaposition of two apparatuses.

To do this, two types of clamps are used:

a first type of clamp (reference 52) which has two angled holes 100A, 100B which are smooth and which pass through the plate (FIG. 1 and the left hand side of FIG. 3); and a second type of clamp (reference 51) which has two thick portions 101 each of which has a tapped hole 102A, 102B.

Screws 103 placed in suitable cavities in the bodies and accessible through the faces of the body enable two apparatuses to be interconnected.

FIG. 2 shows three pneumatic apparatuses, respectively an air filter 110, a pressure regulator 120, and a lubrifier 130 which are interconnected in accordance with the invention.

Each apparatus has one clamp of each type for interconnection in pairs.

The end apparatuses are connected to conduits 141 and 142 by known types of connections 143 using nuts 144.

A clamp in accordance with the invention is strong, cheap, and serves both in the assembly of the various parts making up a pneumatic apparatus and also in operational interconnection of apparatuses to one another and to compressed air conduits.

The invention is applicable to all sorts of apparatus for processing compressed air.

We claim:

1. A connecting clamp for a pneumatic apparatus which comprises a substantially parallelepiped shaped body of plastic material associated with a bottom and with a lid which are placed on respective opposite faces of the body, wherein the clamp is constituted by a rectangular aluminum alloy plate of substantially the same size as one of the other faces of the body, against which it is applied, the clamp including a central tapped sleeve for making a pneumatic connection to other pneumatic equipment and lugs projecting perpendicularly from the plate, each lug having an orifice with its axis extending in a plane parallel to the plane of the plate and capable of receiving a rod or screw for fixing the clamp to the body, the rod or screw also passing through the lid or the bottom to fix the lid or the bottom to the body.

2. A clamp according to claim 1, wherein the sleeve has a shoulder for receiving a sealing ring.

3. A clamp according to claim 1, wherein the face of the plate opposite to the sleeve has a groove for receiving a sealing ring.

4. A clamp according to claim 1, wherein the plate includes at least one smooth hole 100A or 100B which is inclined relative to the normal to the plane of the plate.

5. A clamp according to claim 1, wherein the plate includes at least one thickening or bump which is pierced by a tapped 102A or 102B hole which is inclined relative to the normal to the plane of the plate.

* * * * *